(12) United States Patent
Moore

(10) Patent No.: US 6,199,313 B1
(45) Date of Patent: Mar. 13, 2001

(54) MECHANICAL CLICKING WEIGHT

(76) Inventor: Chuck Moore, 412 S. Baker St., Granbury, TX (US) 76048

(*) Notice: Subject to any disclaimer, the term of this patent is extended or adjusted under 35 U.S.C. 154(b) by 0 days.

(21) Appl. No.: 09/360,683

(22) Filed: Jul. 26, 1999

Related U.S. Application Data

(63) Continuation-in-part of application No. 08/943,317, filed on Oct. 14, 1997, now abandoned.

(51) Int. Cl.$^7$ ..................................................... A01K 85/01
(52) U.S. Cl. .......................... 43/42.31; 43/43.1; 43/42.04
(58) Field of Search ................................ 43/43.1, 42.31, 43/42.04

(56) References Cited

U.S. PATENT DOCUMENTS

| | | |
|---|---|---|
| 2,065,854 | 12/1936 | Edel et al. . |
| 2,153,489 | 4/1939 | Whitis . |
| 2,394,821 * | 2/1946 | Teagarden . |
| 2,737,749 | 3/1956 | Trout . |
| 2,833,078 * | 5/1958 | Pelz . |
| 2,853,826 * | 9/1958 | Romeo . |
| 2,881,548 * | 4/1959 | Backe . |
| 2,977,705 * | 4/1961 | Busnel . |
| 2,999,329 * | 9/1961 | Pankuch . |
| 3,044,207 * | 7/1962 | Dorsett . |
| 3,296,733 * | 1/1967 | McLean . |
| 4,747,228 * | 5/1988 | Giovengo, Jr. ........................ 43/42.31 |
| 5,497,581 * | 3/1996 | Williams .............................. 43/42.31 |

* cited by examiner

Primary Examiner—Jack W. Lavinder
(74) Attorney, Agent, or Firm—Arthur F Zobal

(57) ABSTRACT

The weight has a sound chamber and a tail section. The sound chamber embodies a plunger stem, a plunger seat, a flexible reed or spring biased balls and a compression spring. The tail section embodies a tail canal and an amplifier which forms a venture having a vortex and a vertex intersecting the tail canal. The sound is made when the plunger stem is pulled, the flexible reed or spring biased balls mounted in the plunger seat deflects the sound chamber grooves of the sound chamber. The plunger stem reaches it's maximum travel when the plunger seat reaches the spring seat. The compression spring retracts the plunger stem when the pull is released. The spring's retraction allows the flexible reed or spring biased balls on the plunger set to deflect the sound grooves in the opposite direction until the plunger seats meets the tail seat. The sound induced in the sound chamber is transferred to the tail canal where it is amplified through the vortex and vertex making an amplifier. The split ring on the plunger stem is tied to a selected length of fishing line on a rod and reel by a fisherman. The split ring on the tail section is tied to a selected length of fishing line to a hook, a bait or a lure by the fisherman. The tail section can be changed to different weights by unscrewing it and applying a different tail section.

11 Claims, 4 Drawing Sheets

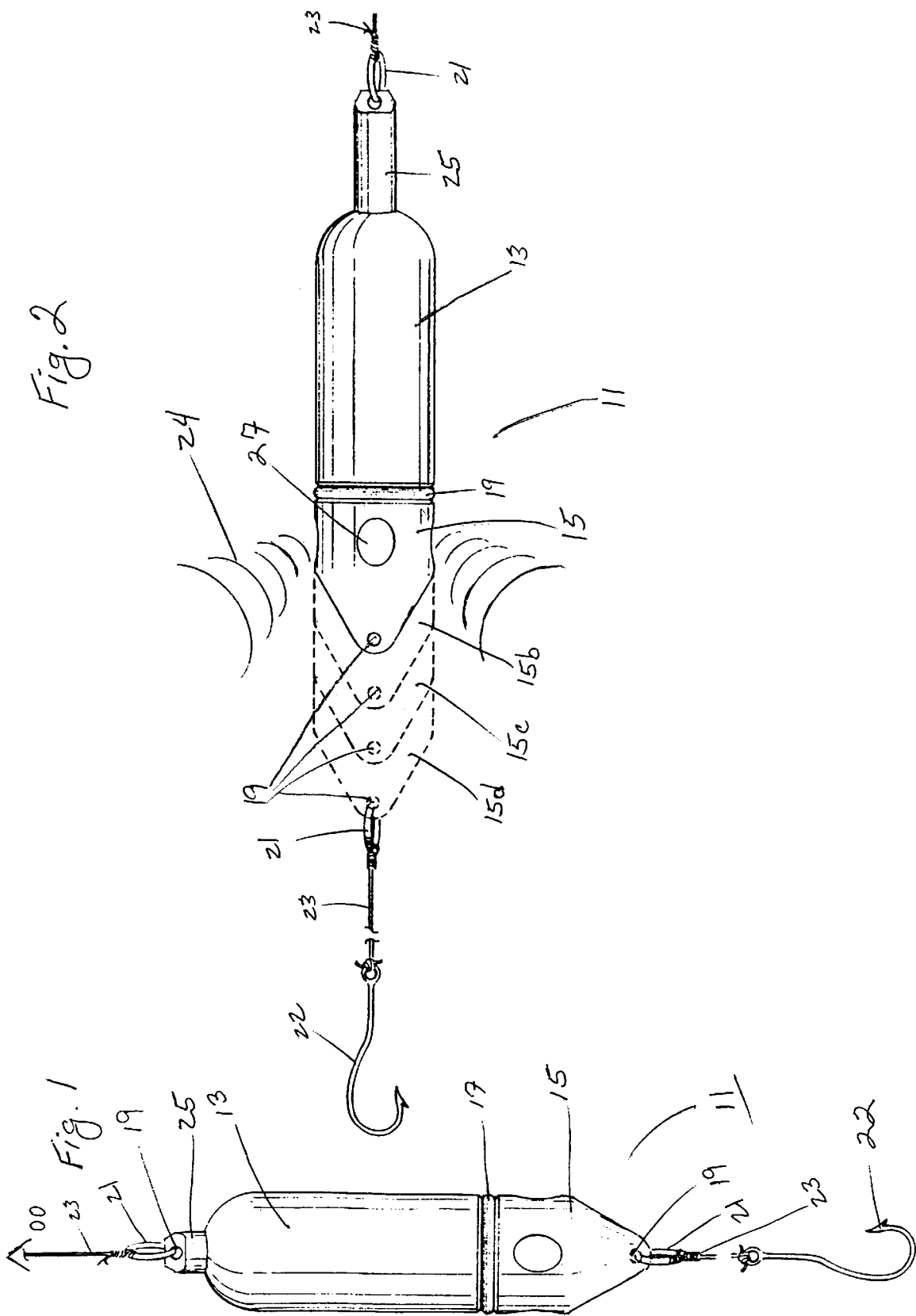

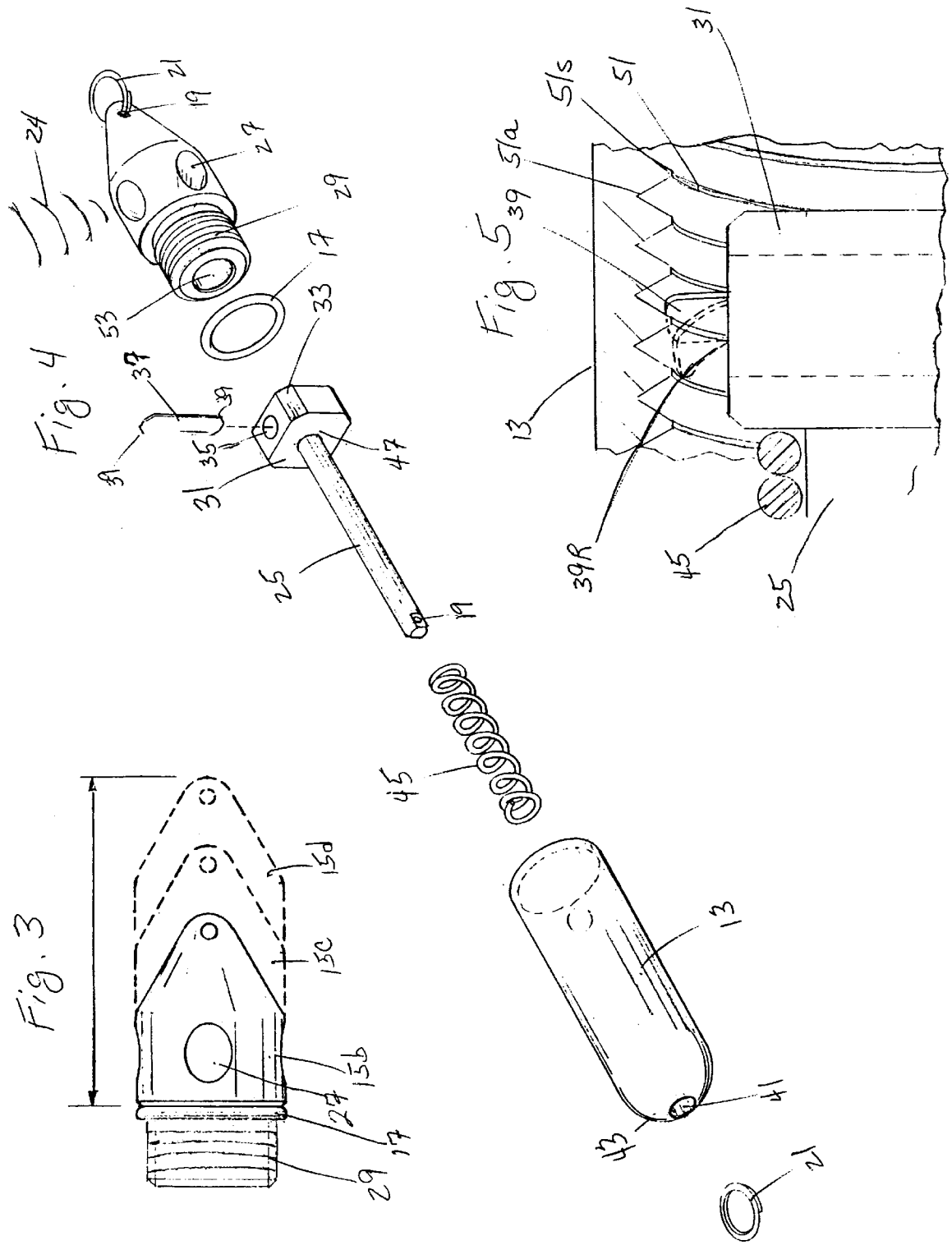

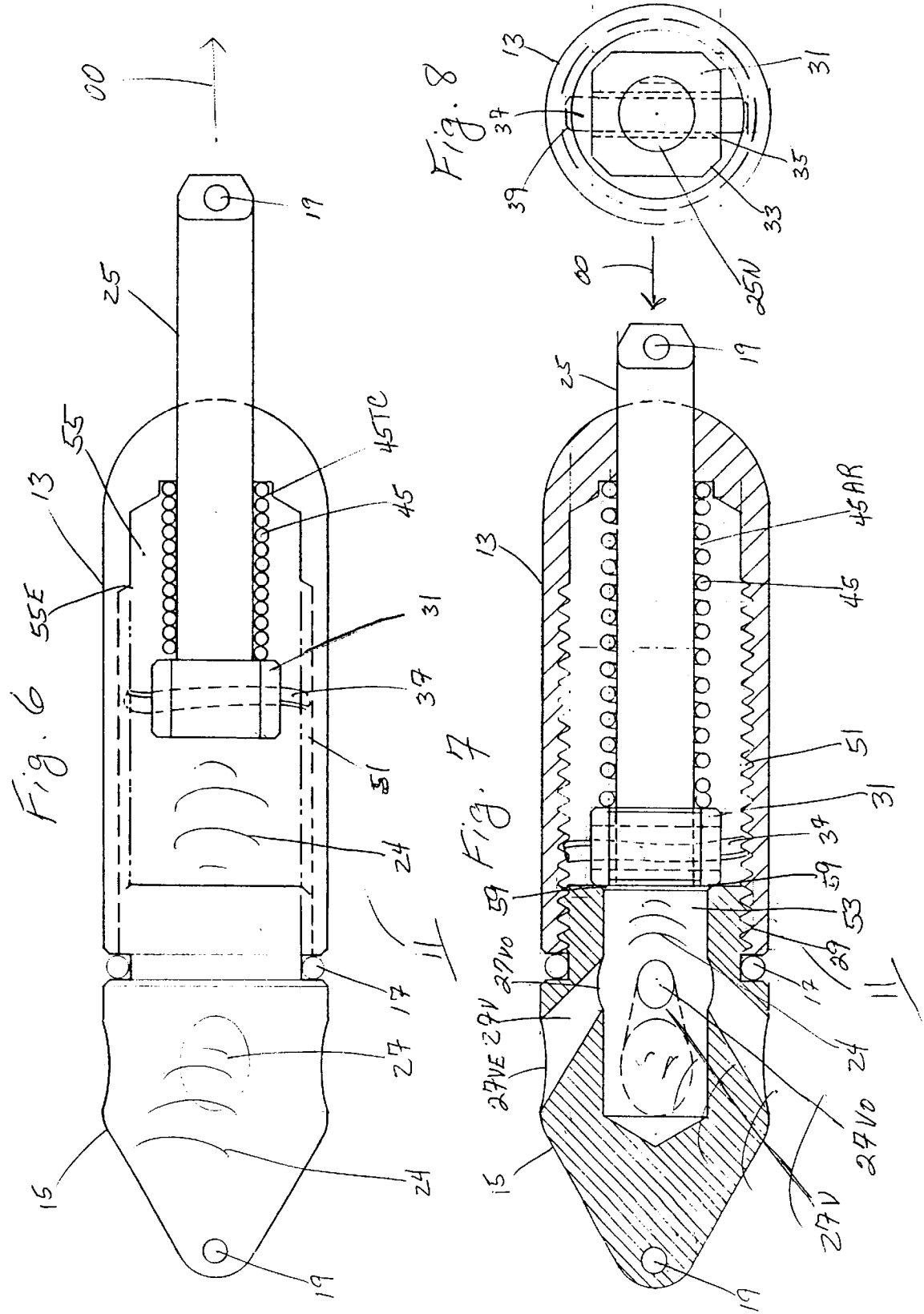

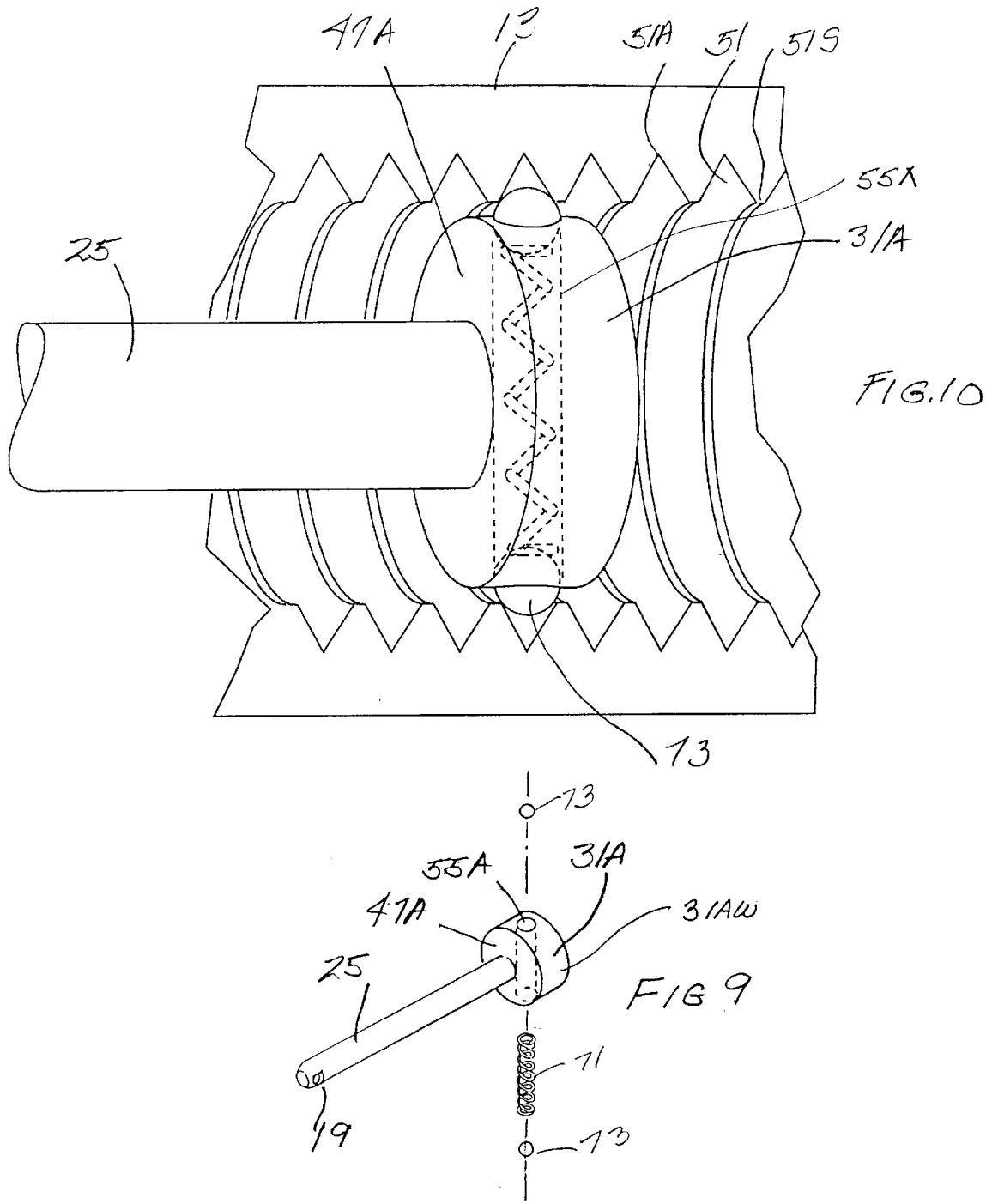

MECHANICAL CLICKING WEIGHT

This application is a continuation-in-part of application Ser. No. 08/943,317 filed on Oct. 14, 1997 now abandon.

BACKGROUND OF THE INVENTION

1. Field of the Invention

The invention relates to a device for attracting fish through a clicking sound. The device is attached to the line of a fishing rod.

2. Description of the Prior Art

Clicking sounds have long been used by fishermen to attract fish to their bait. Sounds have normally been made with metal weights and glass or ceramic beads threaded on their fishing line and allowed to contact each other in the process of moving the bait. These methods require that the bait be moved significantly to produce the sounds that are intended.

SUMMARY OF THE INVENTION

Therefore, it is an object of the present invention to provide a device which may be used to easily attract fish with a clicking sound without moving the bait, and which may also be used to easily change the amount of weight on such an apparatus.

The device comprises having a sound chamber with internal threaded grooves and a sound plunger with a reed which contacts the grooves of the sound chamber. The plunger has a rest position and a pulled position. The device is forced back to the rest position by means of a compression spring placed between the spring seat of the chamber and the plunger seat. The plunger is attached to the fishing line and when pulled, lets the reed in the plunger seat strike the threaded grooves of the chamber seat. The spring is also compressed in this motion until the plunger seat reaches the spring seat, which is near the front of the sound chamber. When the fishing line is released, the compression spring drives the plunger and plunger seat back to the rest position striking the reed against the chamber grooves on the way back.

In another embodiment, the plunger has at least one spring biased member for engaging the chamber grooves as the plunger moves for making the sound.

The device also comprises a tail section which is threaded so as to fit into the threads of the sound chamber. The tail section is tapered as to form a cone shape at it's end and a hole near the end of the cone to affix a split ring. The ring is tied to a fishing line section tied to a hook or bait. The tail section also has a hollow chamber inside the male threaded portion and four tapered holes which are larger on the external portion of the tail. The holes make an amplifying effect of the sound produced in the sound chamber portion. The tail section can be unscrewed from the sound chamber so as to increase or decrease the weight of the device depending on the size of the tail that is attached.

BRIEF DESCRIPTION OF THE DRAWINGS

FIG. 1 is a perspective view of the mechanical clicking weight in the vertical position. The weight is also in what will be known as the rest position.

FIG. 2 is a perspective view of the mechanical clicking weight i the horizontal position. The weight is also in what will be known as the pulled position.

FIG. 3 is a side view of the tail section of the mechanical clicking weight.

FIG. 4 is an exploded view of the mechanical clicking weight.

FIG. 5 is a cut away view of the mechanical clicking device in the sound chamber.

FIG. 6 is a internal view of the mechanical clicking weight in the pulled position.

FIG. 7 is an internal view of the mechanical clicking weight in the rest position.

FIG. 8 is a cross-sectional view of the sound chamber and the plunger seat in it's route of travel.

FIG. 9 illustrates another embodiment of the plunger for making a sound.

FIG. 10 partially illustrates the plunger of FIG. 9 located in the sound chamber.

DESCRIPTION OF THE PREFERRED EMBODIMENTS

Referring now to FIG. 1, the mechanical clicking weight 11 of the invention is identified by reference numeral 11. The weight 11 has a sound chamber 13 and a tail section 15. The sound chamber 13 and the tail section 15 are visually divided by a rubber lock ring 17. An aperture 99 is present in the tail section 15. A split ring 21 is affixed through the aperture 19. A selected length of fishing line 23 is tied to the split ring 21 and the fish hook 22. A split ring 21 is affixed to an aperture 19 present in the plunger stem 25. A fishing line 23 is tied to the split ring 21 which is affixed to the plunger stem 25. The fishing line 23 is a selected length between the weight 11 and the fisherman's rod and reel 00. FIG. 1 shows the weight 11 being used in a vertical manner.

Referring now to FIG. 2, the weight 11 is shown being used in a horizontal manner. The echo lines 24 show the location where the sound exits the weight 11 through the amplifiers 27 in the tail section 15. The tail section 15 may be replaced by tail section 15B to make weight 11 heavier. Tail section 15B can be replaced by tail section 15C to make weight 11 heavier. Tail section 15C may be replaced by tail section 15D to make weight 11 heavier.

As shown in FIG. 3, the tail section 15 is visually longer on tail section 15B, even longer on tail section 15C, and longer yet on tail section 15D. All tail sections 15 embody four amplifiers 27. All tail sections 15 embody a male threaded extremity 29 an a rubber lock ring 17.

Referring now to FIG. 4, the plunger stem is affixed to the plunger seat 31. The plunger seat 31 is square and has rounded corners 33. The plunger seat 31 has a round hole 35 completely through. The flexible reed 37 is centered in the round hole 35. The round hole 35 is slightly smaller in diameter than the flexible reed 37. The flexible reed 37 makes a press fit in the round hole 35 in the plunger seat 31. The flexible reed 37 has rounded corners 39 on all four sides. The rounded corners 39 on the flexible reed 37 are mounted parallel to the rounded corners 33 on the plunger seat 31. These parallel round corners 39 and 33 form a guide so the flexible reed 37 may travel freely through the interior of the sound chamber 13. The round bore 41 which embodies the rounded head 43 of the sound chamber 13 is slightly larger in diameter than that of the plunger stem 25. The round bore 41 is a bearing surface for the plunger stem 25. The compression spring 45 is mounted around the plunger stem 25. The compression spring 45 is always in contact with the spring rest 47 which is the front of the plunger seat 31 where it is affixed to the plunger stem 25.

Referring to FIG. 5, the clicking sound 24, FIG. 4, is produced in the sound chamber 13 through a series of threaded sound grooves 51 in the anticline portion 51A, and the syncline portion 51S. The flexible reed 39 is deflected as shown in 39R by moving the plunger stem 25 and the plunger seat 31. The length of the flexible reed 39 is greater than the diameter of the syncline portion 51S of the sound grooves 51 inside the sound chamber 13, but the flexible reed 39 is shorter in length than the anticline portion 51A of the sound grooves 51 inside the sound chamber 13.

Referring to FIG. 6, the weight 11 is shown in the pulled position. The fisherman's rod and reel 00 are pulling the plunger stem 25 and the plunger seat 31 toward the front of the sound chamber 13. The compression spring 45 is being tightly coiled 45TC as the plunger 25 and plunger seat 31 are pulled forward 00. The compression spring 45 is enclosed in the spring seat 55 through this motion. The flexible reed 37 is deflecting the sound grooves 51. The plunger stem 25 and the plunger seat 31 stop their forward motion when the plunger seat 31 contacts the edge of the compression spring seat 55E.

As shown in FIG. 7, as well as FIG. 6, the clicking sound 24 travels through the sound chamber 13 and enters tail canal 53. The amplifier vortex 27VO is where the sound 24 enters the amplifier 27 from the tail canal 53. The amplifier 27 forms a venture 27V from the amplifier vortex 27VO to the amplifier vertex 27VE.

The plunger stem 25 and the plunger seat 31 are drawn to rest when the fisherman's rod and reel 00 releases tension on fishing line 23 (See FIG. 2). The release in tension allows the compression spring 45 to extract the coils 45AR, so as to where the plunger seat 31 is at rest with the tail seat 59. The male threaded extremity 29 of the tail section 15 is a compatible mate for the sound grooves 51 of the sound chamber 13. They are screwed together until they lock against the rubber lock ring 17.

Referring to FIG. 8, the cross-section shows the clearance between the round corners 33 of the plunger seat 31 from the sound grooves 51 of the sound chamber 13. The rounded corners 33 of the plunger seat 31 show to be parallel with the rounded corners 39 of the flexible reed 37. The round hole 35 and the flexible reed 37 are shown in reverse size in FIG. 8, to show the tolerance of the press fit of the flexible reed 37. The end of the plunger stem 25N is flush with the plunger seat 31. The round hole 35 penetrates through the plunger stem 25 and the plunger seat 31.

In one embodiment, the sound chamber 13 and the tail section 15 may be formed of several different materials, depending on the weight of the weight 11 desired and the conditions of use. The sound chamber 13 and the tail section 15 may be made of different materials embodied together.

The foregoing disclosure and showings made in the drawings are merely illustrative of the principles of this invention and are not to be interpreted in a limited sense. For example, the split ring 21 may be changed to a swivel or solid ring depending on the application of the weight 11 by each individual.

Referring now to FIGS. 9 and 10, there will be described another embodiment of the plunger for making a sound as the plunger is moved forward and/or rearward. The plunger of FIGS. 9 and 10 may be used in the weight in lieu of the plunger of FIGS. 4–8. In FIGS. 9 and 10, like reference numerals identify like elements as disclosed in FIGS. 1–8. In FIGS. 9 and 10, the plunger seat 31A is cylindrical and is connected to the stem 25. The seat 31A has a spring rest 47A. The compression spring 45 surrounds the stem 25 and has one end which engages the rest 47A and an opposite end which engages the inside end of the chamber 13 next to the bore 41 to normally urge the seat 31 A away from the bore 41 with the stem 25 extending through the bore 41. The seat 31 A has an aperture 55A extending therethrough along its diameter. Located in the aperture 55A is a compression spring 71 and two metal balls 73 at the periphery of the outer annular wall 31AW of the seat 31A. The balls 73 can move inward and outward of the aperture 55A. The spring 71 normal urges the balls 73 outward of the apertures 55A such that they engage the grooves 51 as the stem 25 and hence the seat 31A is moved in one direction by the spring 45 or in an opposite direction by the line 23 attached to the outer end of the stem 25, the balls 73 move into and out of the grooves 51 making a clicking sound. The inside diameter of the chamber 13 including the wall structure forming the grooves is sufficient to maintain the balls 73 partially in the aperture 51A.

It is to be understood that the weight of the invention may be used in other ways than applied. For example, encapsulated inside of a fishing lure.

What is claimed is:

1. A mechanical clicking weight for making a clicking sound, comprising:

a sound chamber having sound grooves;

a plunger stem having a plunger seat coupled thereto, said plunger stem and said plunger seat being located in said chamber and being movable in said chamber between a pull position and a rest position;

said plunger seat embodying a flexible reed which engages said sound grooves and forms a sound upon movement of said flexible reed against said sound grooves upon movement of said plunger seat between said pull position and said rest position;

a compression spring located around said plunger stem, said compression spring being in a compressed condition when said plunger stem and said plunger seat are in said pull position and being in an extended position when said plunger stem and said plunger seat are in said rest position;

a fishing line attached to said plunger stem to move said plunger stem and said plunger seat to said pull position upon application of a force to said fishing line;

said compression spring being capable of moving said plunger stem and said plunger seat to said rest position upon release of the force to said fishing line;

a tail section coupled to said sound chamber by means of threading a male threaded extremity of said tail section into said sound grooves of said sound chamber;

a tail canal in said tail section where sound travels from said sound chamber;

at least one opening formed through a wall of said tail section, said at least one opening flares outwardly through said wall of said tail section from said tail canal, an elastic lock ring to lock said sound chamber with said tail section;

a ring embodied in said tail section for receiving a line to which a hook may be attached.

2. The mechanical clicking weight of claim 1, wherein: said tail section is removable from said weight.

3. The mechanical clicking weight of claim 1, wherein: said mechanical clicking weight may be encapsulated in a fishing lure.

4. A weight to be located in water for use for fishing purposes and for making a sound in the water, comprising:

a body having a chamber with a given length, said chamber having a plurality of grooves located along said length, an opening extending through said body at a first end of said chamber, a stem extending through said opening and having a first end exterior of said chamber for attachment to a fishing line and a second end within said chamber, said grooves being located at least on opposite sides of said stem, said stem being movable by way of said opening for movement of said second end of said stem between first and second spaced apart positions in said chamber along said length thereof, elastic means located in said chamber between said opening and said second end of said stem for normally urging said second end of said stem toward said second position in said chamber away from said opening, said second end of said stem being movable against the force of said elastic means in a direction toward said first position when a force is applied to said first end of said stem by way of a fishing line, flexible means coupled to said second end of said stem and supported only by said stem and said second end for engaging said grooves for making a sound as said second end of said stem is moved between said first and second positions in said chamber.

5. The weight of claim 4, wherein:

said elastic means comprises a compression spring.

6. The weight of claim 5, comprising:

an opening formed through said body at an end opposite said first end for facilitating the passage of sound from said chamber into the water.

7. The weight of claim 4, comprising:

a opening formed through said body at an end opposite said first end for facilitating the passage of sound from said chamber into the water.

8. A weight to be located in water for use for fishing purposes and for making a sound in the water, comprising:

a body having a chamber with a given length, said chamber having a plurality of grooves located along said length, an opening extending through said body at a first end of said chamber, a stem extending through said opening and having a first end exterior of said chamber for attachment to a fishing line and a second end within said chamber, said stem being movable by way of said opening for movement of said second end of said stem between first and second spaced apart positions in said chamber along said length thereof, elastic means located in said chamber between said opening and said second end of said stem for normally urging said second end of said stem toward said second position in said chamber away from said opening, said second end of said stem being movable against the force of said elastic means in a direction toward said first position when a force is applied to said first end of said stem by way of a fishing line, at least one spring biased ball coupled to said second end of said stem for engaging said grooves for making a sound as said second end of said stem is moved between said first and second positions in said chamber.

9. The weight of claim 8, wherein:

said elastic means comprises a compression spring.

10. A weight to be located in water for use for fishing purposes and for making a sound in the water, comprising:

a body having a chamber with a given length, said chamber having a plurality of grooves located along said length, an opening extending through said body at a first end of said chamber, a stem extending through said opening and having a first end exterior of said chamber for attachment to a fishing line and a second end within said chamber, said stem being movable by way of said opening for movement of said second end of said stem between first and second spaced apart positions in said chamber along said length thereof, elastic means located in said chamber between said opening and said second end of said stem for normally urging said second end of said stem toward said second position in said chamber away from said opening, said second end of said stem being movable against the force of said elastic means in a direction toward said first position when a force is applied to said first end of said stem by way of a fishing line, a support member coupled to said second end of said stem, for movement with said stem, an aperture formed in said support means, at least one member located at least partially in said aperture, and a spring located in said aperture for normally urging said member outward of said aperture for engaging said grooves for making a sound as said support means moves with said stem.

11. The weight of claim 11, wherein:

said elastic means comprises a compression spring.

* * * * *